Dec. 15, 1931.    L. E. G. BUEHLER    1,836,439
LAMINATED GEAR WHEEL
Filed Jan. 30, 1929
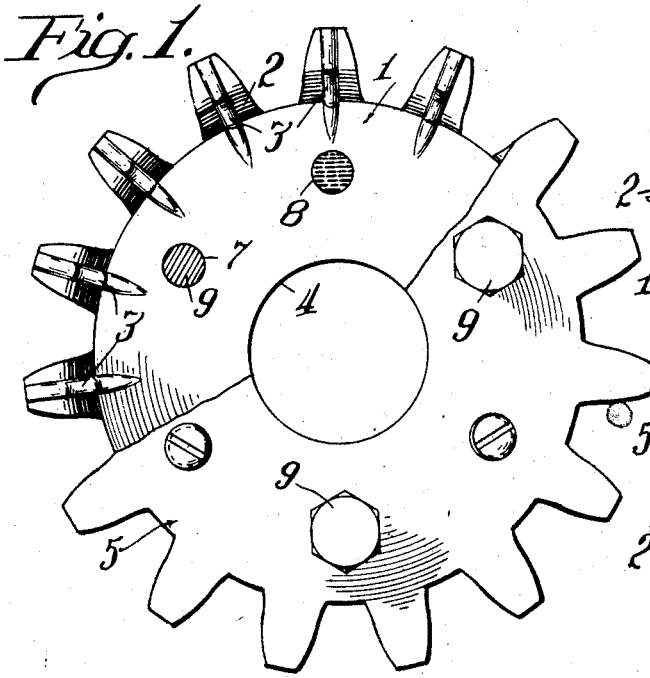
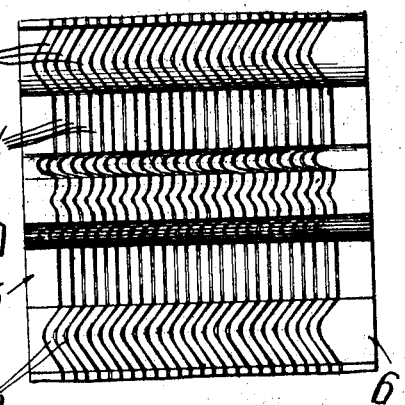
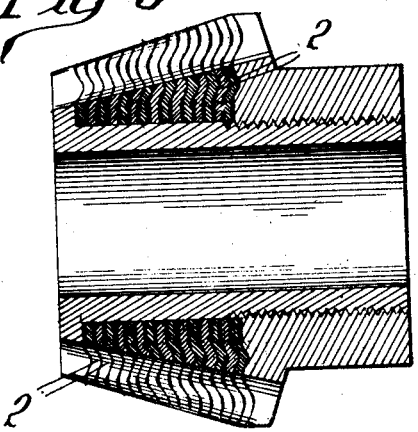
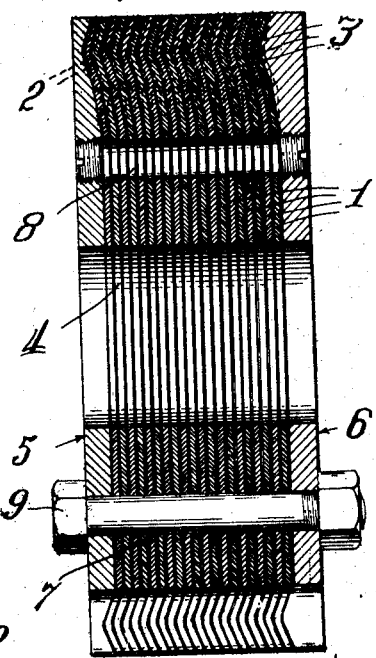
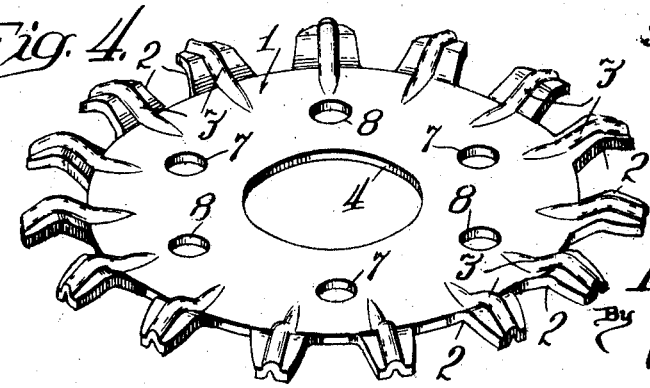
Inventor
Louis E. G. Buehler
By
Attorney Patented Dec. 15, 1931

1,836,439

UNITED STATES PATENT OFFICE

LOUIS E. G. BUEHLER, OF OAK PARK, ILLINOIS

LAMINATED GEAR WHEEL

Application filed January 30, 1929. Serial No. 336,077.

This invention relates to improvements in gear wheels and has for its object to provide wheels, such as spur gears, bevel and mitre gears and pinions, of the laminated and substantially noiseless type which are far more durable and better adapted for high duty work than existing gears of this general class and which are also economical in cost as compared to the existing structures of this type.

A further object of the invention is to provide a laminated gear wheel structure which is so constructed as to be minutely foraminous radially and is provided with chambers adapted to contain lubricant capable of finding its way through the radial channels to the toothed surface for lubricating the latter.

The general object of the present invention is to provide a laminated gear wheel structure presenting the aforesaid advantages and such other and further advantages as are particularly described in the following specification.

In the accompanying drawings illustrating embodiments of the invention:

Fig. 1 is a side elevation, a side plate partly broken away and showing a part in section, of a laminated spur gear wheel constructed in accordance with the invention.

Fig. 2 is a face view of the same.

Fig. 3 is a diagrammatic sectional view of the same.

Fig. 4 is a perspective view of one of the sheet metal plates of the structure of Figs. 1 to 3 inclusive.

Fig. 5 is a diametric sectional view of a bevel gear pinion constructed in accordance with the invention.

The main strains and stresses borne by spur and bevel gear wheels are applied directly to the teeth thereof and, therefore, it has been recognized that in a laminated gear structure the teeth of the component elements or plates must be firmly interlocked with each other in order that any local strains or stresses, such as would result from a steel chip or the like caught between intermeshing gears, may not distort one or more teeth of component disks or plates and throw them out of register with those of other component elements but instead, distribute the local strain or stress over the entire width face of the gear. My invention therefore, comprehends a structure wherein the teeth of the component elements are so associated and interlocked with each other as to practically preclude distortion of the teeth of one or more component elements under the influence of local stress or strain but to effect a distribution of the said stress or strain over the entire width of face of the gear.

A further very essential and desirable feature of a laminated gear structure is to so form and interlock the teeth of component elements with each other as to cause the side faces of said teeth to be disposed angularly to a plane perpendicular to the axis of rotation of the wheel in order that the wipe of the teeth of intermeshing gears may be distributed so that no point of contact shall be continuous along the side face of a tooth of any component element or plate of the structure. My invention therefore also comprehends such a shaping of the teeth of the component elements of the gear as will cause such a distributed wipe along the tooth faces as will prevent, for example, a cutting of a solid steel or castiron gear by a tooth of the intermeshing laminated gear at any point as would result from straight faces of teeth of flat plates of laminated gears due to variations in hardness of the component plates. The advantage of the distribution of wipage as defined resides also in the more uniform distribution of lubricant and consequent uniformity of wear on the teeth of intermeshing gears.

The laminated gear structure of the present invention comprises a number of initially flat, circular sheet metal plates 1, each of which is provided adjacent its periphery with one or more annular concavo convex formations 2 each presenting an annular groove in one face and an annular rib or bead on the other face of each plate.

These formations 2 are intersected by radial concavo convex formations 3 which vanish at a point inwardly of the formations 2 and spaced from the middle portion of the plate 1 which contains the central opening 4 for the passage of the shaft carrying the assembled gear, thus leaving a plane flat undistorted portion of each plate between the opening 4 and the vanishing points of the formations 3, the latter presenting the concavo portions on the same face of the plate 1 as the annular formation 2. The formations 2 and 3 may be termed as to one face of the plate "female" and as to the other face "male" formations, the male formations of one plate engaging in the female formations of the next adjacent plate. These formations 2 and 3 may be produced simultaneously or successively by means of suitable dies and an ordinary punch-press.

The formations 3 must correspond in number with the teeth of the finished gear, the circular plates 1 being first assembled with end plates 5 and 6 respectively, having outer plane surfaces and inner faces of respectively male and female type corresponding to and interlocking with the female and male faces of the outermost plates 1 of a set, said plates 5 and 6 being preferably drop-forged. The plates 1, 5, and 6 are provided preferably with two sets of axially aligned openings 7 and 8, alternated with each other, the former permitting the insertion of bolts, rivets or other assembly members 9, while the openings 8 serve as receptacles for lubricant and are suitably sealed at their ends.

In manufacturing the plates 1 for the production of spur gear wheels, only a single formation 2 is provided in each component member, but for the production of bevel and mitre gears and pinions the number of formations 2 will be increased to the extent required and the formations 3 lengthened to intersect all formations 2 in order that the smaller ends of all teeth of the finished gear may be interlocked with each other substantially uniformly throughout.

After a set of plates 1, 5, and 6 has been assembled to provide a cylindrical blank, the cutting of teeth will be accomplished as in the case of solid steel or castiron or other solid metal gears cutting out metal midway between contiguous interengaged formations 3.

The formations 2 and 3 may be varied in cross-sectional shape as, for example, rendering them V-shaped or curved on short radii or to correspond with the end portions of ellipses, depending upon the degree of distortion of the teeth desired, these various formations being omitted from specific illustration as well within the understanding of those skilled in the art.

Upon disassembly of a completed gear wheel composed of the plates 1, 5, and 6, it will be found that the teeth of each component element are cupped or dished and that the side faces of said teeth of the plates 1 describe a curve the depth and radius of which corresponds to the cross-sectional shape of the formation 2 so that when a completed gear wheel constructed as above described is in mesh with a companion gear of the same or the solid metal type, there will be no point in a tooth of the latter which will wipe or ride continuously along a face of a tooth of any component plate of the laminated gear but will contact with several teeth of component plates of the latter. In other words, a plane perpendicular to the axis of rotation of the laminated gear constructed as herein described and illustrated will intersect more than one of the teeth of the component plates but will intersect each such tooth at two points in the side face of the tooth or in the convex or concave face of the latter.

Obviously, as the formations 2 and 3 of each tooth are spaced from each other a distance equal to the thickness of the metal of the plates 1, the male formations cannot fit absolutely snugly into the female formations of successive teeth due to normal inaccuracy or lack of uniformity of thickness of the metal and due also to the fact that the male face of each of said formations is necessarily slightly larger than the female face. Consequently as male faces of said formations nest in the female faces, a minute spacing apart of the flat middle portions of the plates 1 will occur. These spaces plus the minute radial passages between the nested formations permit penetration of lubricant to fill the same and promotes noislessness of intermeshed gears and, in the instant case, the flow of lubricant from the chambers or receptacles therefor to the face of the laminated gear.

As distinguished from laminated gears wherein the component plates are provided with only radial formations corresponding in number and location with the teeth of the finished gear, the laminated gear of my invention presents teeth on the component plates which have far more angular side faces and, therefore, better distribute the wear and wipage besides affording a more efficient interengagement with the teeth of adjacent plates or disks 1.

I have also found that the manufacture of the plates 1 with the formations 2 and 3 is far easier than the manufacture of plates having only radial formations extending from the central opening to the circumferential edges of the component plates in that in the latter all of the metal of the plates undergoes distortion and stretch which requires far more power and results in a great deal of cracking of the metal and consequent waste especially if the radial formations are of a depth and cross-sectional contour sufficient to provide an efficient interengagement of teeth of adjacent disks to be sufficiently angularly disposed as to cause a plane perpendicular to the axis of the gear to be incapable of intersecting a tooth of any plate throughout the radial length of the latter.

In the case of the vanishing radial formations 3 of my invention, the metal of the initially circular plate is distorted and stretched only adjacent the periphery thereof and to a far less degree as to depth on the female side in order to produce a side face to each tooth of a component plate to provide the type of wipage above referred to. There is consequently no cracking of the metal and consequent waste nor is the power required to form said plates as great. Hence the gears of the present invention can be produced at far less cost than existing laminated gears composed of only radially grooved plates besides presenting the several other advantages hereinbefore pointed out.

I claim as my invention:

1. A laminated gear wheel including a series of flat plates each having gear teeth, said gear teeth being distorted by bends therein extending radially of said plate and by other bends extending substantially transversely of said first-named bends, whereby the teeth of contiguous plates are caused to nest in each other.

2. A blank for producing laminated gear wheels including a series of circular plates each provided adjacent its circumferential edge each with an annular bead and with radial beads corresponding in number and location with the teeth of the gear to be cut from said blank, said radial beads intersecting said annular beads.

3. A blank for producing laminated gear wheels including a series of circular plates each provided adjacent its circumferential edge each with an annular bead and with radial beads corresponding in number and location with the teeth of the gear to be cut from said blank, said radial beads intersecting said annular beads, each of said radial beads vanishing at a point spaced from the central portion of the plate to thereby provide plane flat middle portions of said plate bordering central shaft-receiving openings in the latter.

4. A laminated gear wheel including a series of initially circular plates each provided with a central opening and with intersecting annular and radial beads, the radial beads corresponding in number and location with the teeth of the gear and said plates cut away between the radially beaded tooth portions through the annular bead to provide gear teeth nesting into each other.

5. A laminated gear wheel including a series of flat plates each provided with gear teeth, each of said teeth being laterally and radially distorted, the lateral distortions of the teeth of each plate coacting with those of the teeth of contiguous plates to prevent relative radial movement of said teeth and the radial distortion thereof coacting to prevent relative lateral movement of the teeth of said contiguous plates.

6. A laminated gear wheel including a series of flat plates each provided with gear teeth, each of the latter being radially and laterally distorted for causing the teeth of one plate to be nested with the teeth of contiguous plates, the radial distortions of the teeth extending into the plate inwardly of said teeth.

7. A laminated gear wheel including a series of flat plates each provided with gear teeth, each of the latter being provided with two sets of formations extending respectively radially and laterally of said teeth in intersecting relation to each other for causing the teeth of one plate to be nested with the teeth of contiguous plates, the radial distortions of the teeth extending into the plate inwardlly of said teeth and vanishing in the latter at points adjacent the inner ends of said teeth.

8. A laminated gear wheel including a series of initially circular flat plates each provided with a central opening and with openings spaced from said central opening, each of said plates provided with annular and radial formations, the latter intersecting the former and corresponding in number and location with the teeth of the gear wheel, said plates cut away between said radial formations through the annular formations, coupling means engaging in some of said last-named openings to secure the plates against separation, the remainder of said last-named openings constituting receptacles for lubricant.

9. A laminated gear wheel comprising a pair of opposed side plates having outer plane faces, and a series of intermediate sheet metal plates, all of said plates being initially circular and said intermediate plates annularly and radially distorted to provide each thereof with gear tooth portions having male and female faces interengaging with those of adjacent plates, the inner faces of the side plates corresponding to and interengaging with opposed faces of contiguous plates, all of said plates cut away between the tooth portions, the interengagement of the latter effecting minute spacing of the central portions of the plates from each other to permit penetration of lubricant.

10. A laminated gear wheel comprising a pair of opposed side plates having outer plane faces, and a series of intermediate sheet metal plates, all of said plates being initially circular and said intermediate plates annularly and radially distorted to provide each thereof with gear tooth portions having male and female faces interengaging with those of adjacent plates, the inner faces of the side plates corresponding to and interengaging with opposed faces of contiguous plates, all of said plates cut away between the tooth portions, the interengagement of the latter effecting minute spacing of the central portions of the plates from each other to permit penetration of lubricant, means for clamping all of said plates against separation, and receptacles for lubricant inwardly of the teeth of said plates and communicating with the spaces between said plates.

11. A laminated gear wheel including a series of flat plates each provided with gear teeth, each of the latter being substantially dished on relatively substantially transversely disposed axes to present respectively a substantially concave and a substantially convex face to cause nesting of the teeth of contiguous plates.

12. A laminated gear wheel including a series of plates each equipped with integral substantially cupped gear teeth each presenting a male and a female face to cause nesting of the teeth of contiguous plates, there being bead formations radially of each plate extending from points radially inward of said teeth and vanishing in the latter and in the surfaces of said plate.

13. A laminated gear wheel including a series of flat circular plates each equipped with gear teeth, each of which said gear teeth being substantially V-shaped in cross-section radially of the plate and substantially V-shaped in cross-section on a plane extending substantially transversely of the radial plane of the disk passing through the middle of the tooth.

14. A laminated gear wheel including a series of nested circular plates equipped with integral gear teeth, each of said teeth being provided with male and female formations extending respectively angularly of each other and coacting with similar formations of contiguous teeth of adjacent plates to prevent movement of a tooth of one plate relatively to the corresponding tooth of an adjacent plate independently of the remaining teeth of said plates.

15. A blank for a laminated gear wheel assembly comprising a plate having a plane flat central portion and provided in its marginal portion with radial formations presenting recesses in one face and projections on the other face of said plate.

16. A blank for a laminated gear wheel assembly comprising a circular plate having a plane flat central portion and provided in its marginal portion with radial formations each presenting a recess in one face and a projection on the other face of said plate.

17. A blank for a laminated gear wheel assembly comprising a circular plate having a plane flat central portion and provided in its marginal portion with radial formations corresponding in number with the number of gear teeth to be cut in said blank, each of said formations presenting a recess in one face and a projection on the other face of said plate.

18. A blank for a laminated gear wheel assembly comprising a circular plate having a plane flat central portion and provided in its marginal portion with radial formations corresponding in number with the number of gear teeth to be cut in said blank, and being of greater length than the depth of the said teeth to be cut, each of said formations presenting a recess in one face and a projection on the other face of said plate.

19. A blank for a laminated gear wheel assembly comprising a gear-toothed plate having a flat plane central portion and radial formations extending from the ends of the teeth of said blank to a point spaced from the bases thereof, said formations being disposed midway between the side faces of said teeth and each presenting a recess in one face and a projection on the other face of said plate.

20. A blank for a laminated gear wheel comprising a flat plate provided within the zone of its circumferential edge to be cut to form gear teeth, with an annular bead, the latter being adapted to be cut away in the hollows between adjacent teeth of said plate when cut and effecting lateral distortion of said teeth when cut.

21. A laminated gear wheel including a series of flat plates each equipped with gear teeth, each tooth of each plate having a substantially concave and a substantially convex face, every point in the convex face of each tooth of each plate being disposed out of the plane of the corresponding face of the middle portion of the plate of which said tooth forms a part.

22. A laminated gear wheel including a series of flat plates each equipped with gear teeth, each tooth of each plate being offset laterally relatively to the faces of the middle portion of the plate of which it forms a part.

LOUIS E. G. BUEHLER.